(12) United States Patent
Pyrhönen et al.

(10) Patent No.: US 8,193,889 B2
(45) Date of Patent: Jun. 5, 2012

(54) FILTER APPLIANCE FOR A MULTIPHASE ELECTRICAL CONVERTER DEVICE

(75) Inventors: Juha Jaakko Pyrhönen, Lappeenranta (FI); Pertti Tapani Silventoinen, Lappeenranta (FI); Mikko Pekka Juhani Kuisma, Lappeenranta (FI); Valentin Dzhankhotov, Lappeenranta (FI)

(73) Assignee: The Switch Drive Systems Oy, Lappeenranta (FI)

( * ) Notice: Subject to any disclaimer, the term of this patent is extended or adjusted under 35 U.S.C. 154(b) by 0 days.

(21) Appl. No.: 12/778,773

(22) Filed: May 12, 2010

(65) Prior Publication Data

US 2011/0007433 A1    Jan. 13, 2011

(30) Foreign Application Priority Data

May 14, 2009   (FI) .................................... 20095541

(51) Int. Cl.
*H01F 27/32* (2006.01)
*H01F 38/12* (2006.01)
*H03H 7/00* (2006.01)
*H02J 1/02* (2006.01)

(52) U.S. Cl. ............... 336/84 R; 336/84 C; 336/84 M; 333/184; 307/105

(58) Field of Classification Search ............ 336/84 R, 336/84 C, 84 M; 333/184; 307/105
See application file for complete search history.

(56) References Cited

U.S. PATENT DOCUMENTS

| | | | | |
|---|---|---|---|---|
| 2,477,475 A | * | 7/1949 | Braden | 336/87 |
| 2,553,324 A | * | 5/1951 | Lord | 336/73 |
| 3,705,365 A | * | 12/1972 | Szabo et al. | 333/12 |
| 4,041,364 A | * | 8/1977 | Gauper, Jr. | 363/15 |
| 4,089,049 A | * | 5/1978 | Suzuki et al. | 363/17 |
| 4,983,934 A | | 1/1991 | Okumura | |
| 5,187,456 A | | 2/1993 | Hayashi | |
| 5,499,178 A | * | 3/1996 | Mohan | 363/39 |
| 7,148,768 B2 | * | 12/2006 | Yanagisawa et al. | 333/184 |
| 7,378,754 B2 | * | 5/2008 | Shudarek | 307/13 |
| 2003/0038699 A1 | | 2/2003 | Nakatsu et al. | |
| 2005/0040093 A1 | | 2/2005 | Yanagisawa et al. | |
| 2008/0031024 A1 | * | 2/2008 | Pasuri et al. | 363/65 |
| 2009/0237197 A1 | * | 9/2009 | Ikriannikov et al. | 336/212 |

FOREIGN PATENT DOCUMENTS

| | | |
|---|---|---|
| GB | 2250392 A | 6/1992 |
| JP | 03087008 A | 4/1991 |

* cited by examiner

*Primary Examiner* — Anh Mai
*Assistant Examiner* — Tsz Chan
(74) *Attorney, Agent, or Firm* — Birch, Stewart, Kolasch & Birch, LLP

(57) ABSTRACT

A filter appliance comprises first electrical terminals (201-203) for connecting to a multiphase electrical converter device, second electrical terminals (204-206) for connecting to a load, main current coils formed of foil conductors and connected between the first and the second electrical terminals, and shielding coils whose first ends are electrically connected to a third electrical terminal (219) of the filter appliance. Each of the shielding coils is formed of foil conductor that is alongside and a distance apart from the foil conductor of the corresponding main current coil so as to form a capacitive shield between successive turns of the main current coil. When the third electrical terminal is connected to constant electrical potential, the shielding coils reduce the common mode voltage applied to the load and, for example, a risk of bearing damages in an electrical motor driven by a multiphase electrical converter device is reduced.

24 Claims, 6 Drawing Sheets

US 8,193,889 B2

FILTER APPLIANCE FOR A MULTIPHASE ELECTRICAL CONVERTER DEVICE

FIELD OF THE INVENTION

The invention relates to a filter appliance for a multiphase electrical converter device. Furthermore, the invention relates to a multiphase electrical converter device comprising a filter appliance.

BACKGROUND

In many electrical converter devices, e.g. in a frequency converter, there is a need for a filter appliance between a converter stage arranged to produce, e.g. by Pulse Width Modulation (PWM), multiphase alternating voltage and an external electrical system, e.g. an electrical motor or generator, that is electrically connected to the electrical converter device. The filter appliance can be needed, for example, for suppressing common-mode electrical current, for reducing slew rate of output voltages (du/dt) of the converter stage, for over-current protection, for reducing radio frequency emissions, and/or for suppressing harmonics of voltages and/or of electrical currents. The filter appliance may comprise one or more coils preferably made of foil conductors that are suitable for high frequency electrical currents, especially, when the thickness of the foil conductors is less than the penetration depth of signals on the frequency range under consideration.

FIG. 1a shows a filter appliance according to the prior art and suitable for a three-phase electrical converter device. FIG. 1b shows a section view taken along the line A-A shown in FIG. 1a. The filter appliance comprises three first electrical terminals 101, 102 and 103 for receiving alternating voltages produced by a multiphase electrical converter device and three second electrical terminals 104, 105 and 106 for electrically connecting to an external electrical system, e.g. to an electrical motor or generator. The filter appliance comprises three coils 107, 108 and 109. Each of the coils is formed of foil conductor and is electrically connected between one of the first electrical terminals and one of the second electrical terminals. A detail of the coil 107 is shown in a partial magnification 110. The coil 107 comprises a foil conductor 111. The successive turns of the coil 107 are spaced apart from each other with the aid of an insulating layer 112. It is also possible that, instead of the insulating layer 112, there are discrete spacer-elements arranged to keep the successive turns of the coil 107 apart from each other. The foil conductor can be made of, for example, copper or aluminium. The insulating layer 112, or correspondingly the spacer-elements, may comprise for example mica insulator. The filter appliance may further comprise a magnetic core structure 113 made of magnetically amplifying material, i.e. material having the relative permeability greater than unity ($\mu_r > 1$). The magnetic core structure can be made of ferromagnetic or paramagnetic material. The magnetic core structure is preferably made of soft magnetic material that provides low hysteresis and eddy current losses, e.g. electrical steel sheets, soft magnetic powder, ferrites, etc. It is also possible that the filter appliance is an air-core filter i.e. there is no magnetically amplifying material on routes of magnetic fluxes produced by electrical currents flowing in the coils 107, 108 and 109.

An inconvenience related to the above-described filter appliance is caused by the capacitive coupling between successive turns of the coils. The capacitive coupling between successive turns of the coils causes worsening of the high frequency properties of the filter appliance.

SUMMARY

In accordance with a first aspect of the invention, there is provided a new filter appliance suitable for a multiphase electrical converter device. A filter appliance according to the invention comprises:
  at least three first electrical terminals for receiving alternating voltages produced by the multiphase electrical converter device,
  at least three second electrical terminals for electrically connecting to an external electrical system,
  at least three main current coils, each of the main current coils being formed of foil conductor and being electrically connected between one of the first electrical terminals and one of the second electrical terminal, and
  at least three shielding coils, the first ends of which are electrically connected to a third electrical terminal of the filter appliance,
wherein each of the main current coils is provided with at least one of the shielding coils and each of the shielding coils is formed of foil conductor that is alongside and a distance apart from the foil conductor of the corresponding main current coil so as to form a capacitive shield between successive turns of the corresponding main current coil.

The above-mentioned third electrical terminal of the above-described filter appliance is preferably electrically connected to a substantially constant electrical potential when the filter appliance is used for filtering voltages and electrical currents produced with a multiphase electrical converter device. In this case, the filter appliance constitutes an inductor-capacitor filter, i.e. an LC-filter, based on distributed inductances along the main current coils and the shielding coils and distributed capacitances between the main current coils and the shielding coils. The capacitive coupling between successive turns of the main current coils is weakened due to the foil conductors of the shielding coils between the successive turns of the main current coils. Hence, the high frequency properties of the filter appliance can be improved by electrically connecting the third electrical terminal of the filter appliance to the substantially constant electrical potential. Furthermore, in many cases, there is no need for additional capacitors in order to form an LC-filter since the capacitance between the respective main current and shielding coils can be designed sufficiently near to a desired capacitance value by adjusting the thickness and/or dielectric properties of an electrically insulating material between the foil conductors of the respective main current and shielding coils and/or by adjusting the ratio of areas of the foil conductors of the respective main current and shielding coils. Furthermore, when the third electrical terminal is electrically connected to the substantially constant electrical potential, the shielding coils reduce the common mode voltage applied to the external electrical system, e.g. an electrical motor or generator. This reduces, for example, a risk of electrically caused bearing damages in an electrical motor or generator electrically connected to a multiphase electrical converter device.

In accordance with a second aspect of the invention, there is provided a new multiphase electrical converter device. A multiphase electrical converter device according to the invention comprises:
  a converter stage arranged to produce multiphase alternating voltage, and
  a filter appliance comprising first electrical terminals electrically connected to alternating voltage terminals of the converter stage, second electrical terminals for electrically connecting to an external electrical system, and main current coils, each of the main current coils being formed of foil conductor and being electrically connected between one of the first electrical terminals and one of the second electrical terminals, wherein the filter appliance further comprises shielding coils so that each of the main current coils is provided with at least one of the shielding coils and first ends of the shielding coils are electrically connected to a third electrical terminal that is electrically connected to a substantially constant electrical potential, each of the shielding coils being formed of foil conductor that is alongside and a distance apart from the foil conductor of the corresponding main current coil so as to form a capacitive shield between successive turns of the corresponding main current coil.

A method according to the invention for filtering voltages produced by a multiphase electrical converter device comprises using a filter appliance according to the invention on routes of electrical currents between alternating voltage terminals of the multiphase electrical converter device and an external electrical system, e.g. an electrical motor supplied with the multiphase electrical converter device.

A number of exemplifying embodiments of the invention are described in accompanied dependent claims.

Various exemplifying embodiments of the invention both as to constructions and to methods of operation, together with additional objects and advantages thereof, will be best understood from the following description of specific exemplifying embodiments when read in connection with the accompanying drawings.

The verb "to comprise" is used in this document as an open limitation that does not exclude the existence of also unrecited features. The features recited in depending claims are mutually freely combinable unless otherwise explicitly stated. The phrase "to electrically connect" is used in this document to mean electrically connecting directly as well as to mean electrically connecting via intermediate elements such as electrical wires and electrical components.

BRIEF DESCRIPTION OF THE FIGURES

The exemplifying embodiments of the invention and their advantages are explained in greater detail below in the sense of examples and with reference to the accompanying drawings, in which:

FIGS. 1a and 1b have been explained earlier in this document in conjunction with the description of the prior art related to the present invention.

DESCRIPTION OF THE EMBODIMENTS

Figure 1A:
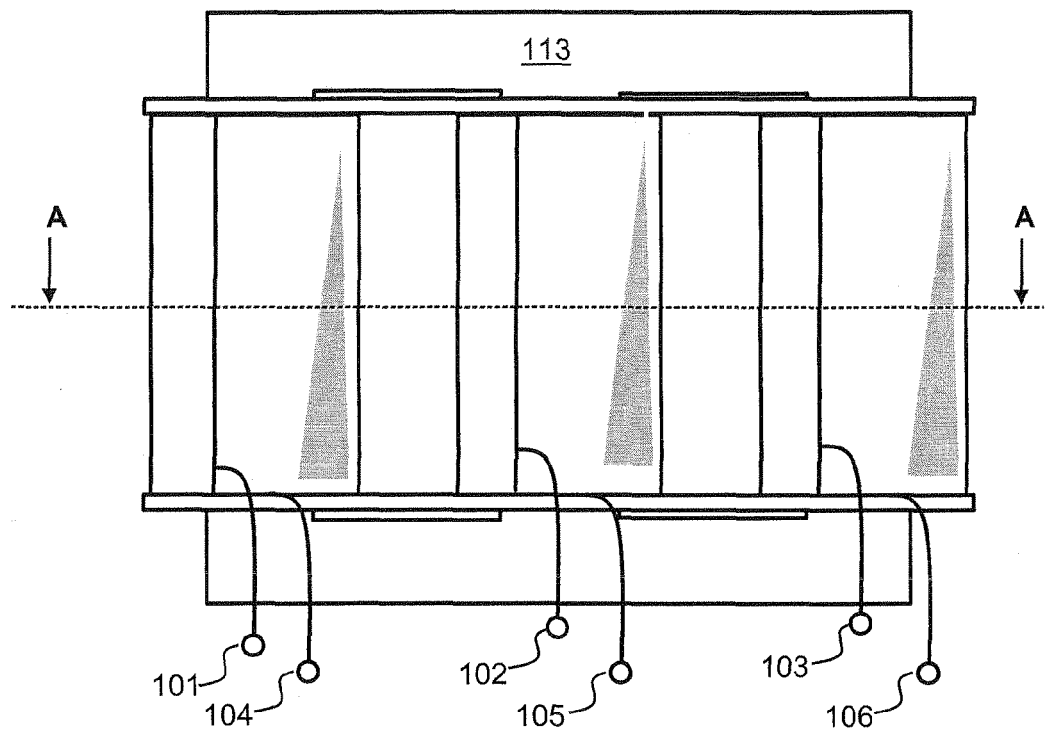
FIG. 1a shows a filter appliance according to the prior art and suitable for a three-phase electrical converter device.
Figure 1B:
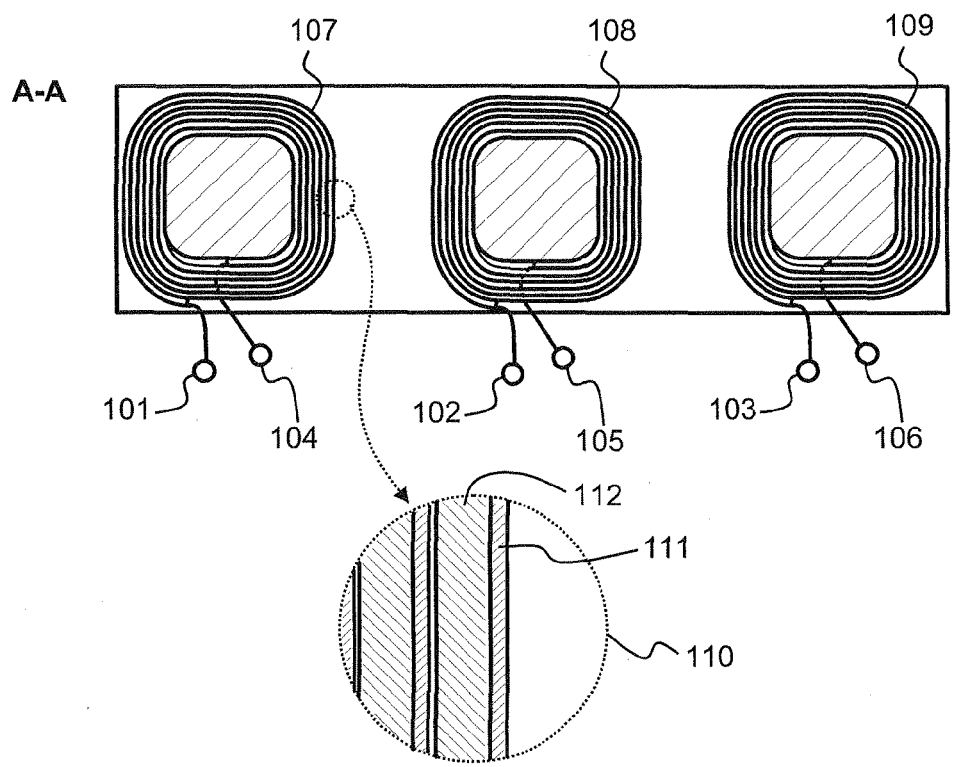
FIG. 1b shows a section view taken along the line A-A shown in FIG. 1a, FIG. 2a shows a filter appliance according to an embodiment of the invention and suitable for a three-phase electrical converter device.
Figure 2A:
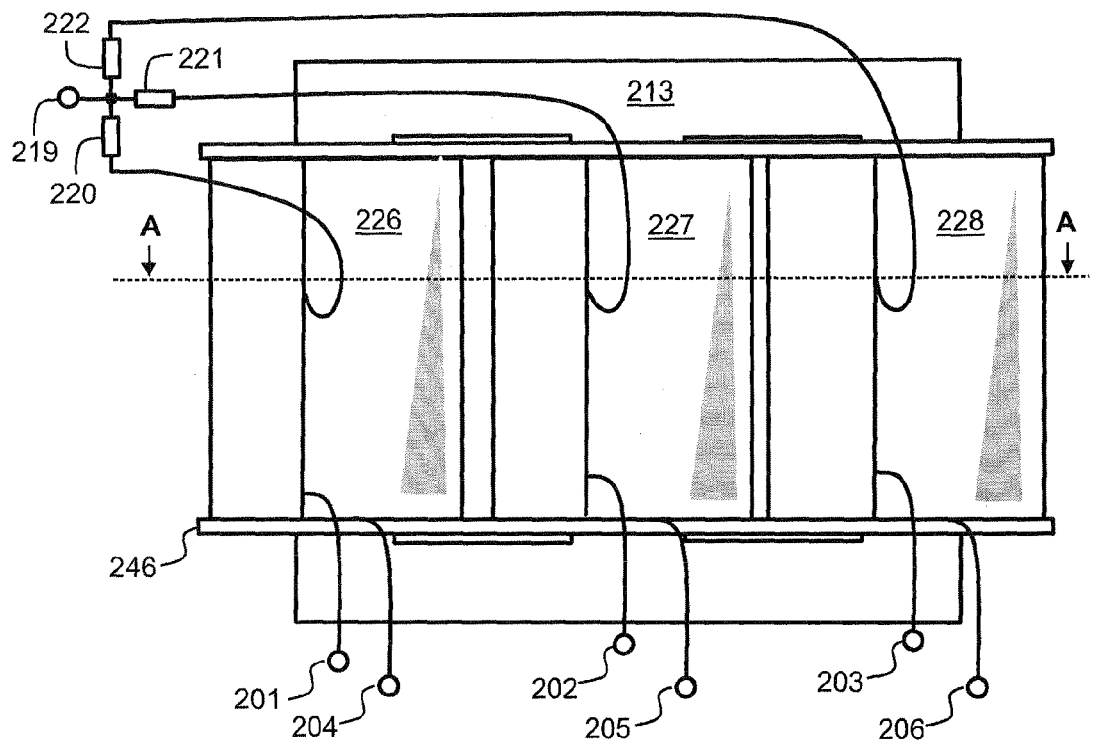
FIG. 2b shows a section view taken along the line A-A shown in FIG. 2a, FIG. 3 shows a filter appliance according to an embodiment of the invention and suitable for a three-phase electrical converter device.
Figure 2B:
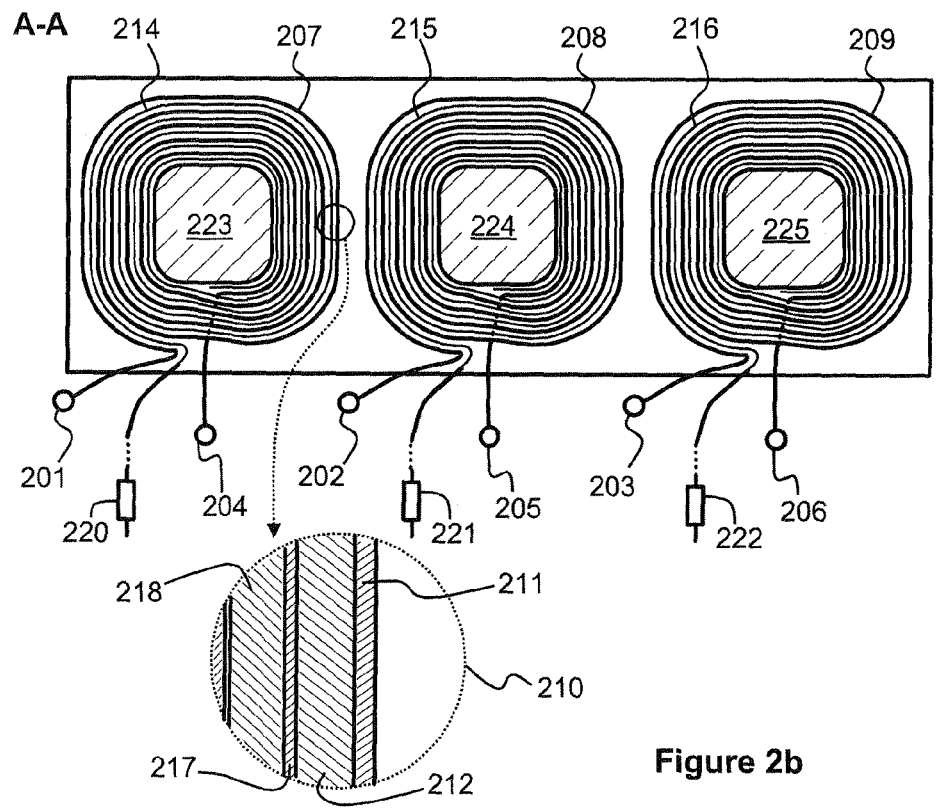

FIG. 2a shows a filter appliance according to an embodiment of the invention and suitable for a three-phase electrical converter device. FIG. 2b shows a section view taken along the line A-A shown in FIG. 2a. The filter appliance comprises three first electrical terminals 201, 202 and 203 suitable for receiving alternating voltages produced by a three-phase electrical converter device, e.g. a three-phase PWM-inverter (Pulse Width Modulation). The filter appliance comprises three second electrical terminals 204, 205 and 206 for electrically connecting to an external electrical system, e.g. to a three-phase electrical motor or generator. The filter appliance comprises three coils 207, 208 and 209 shown in FIG. 2b. Each of the coils 207, 208 and 209 is formed of foil conductor and is electrically connected between one of the first electrical terminals and one of the second electrical terminals. These coils are intended to carry electrical currents flowing between alternating voltage terminals of a multiphase electrical converter device and an external electrical system such as e.g. an electrical motor or generator. Hence, these coils are hereinafter called main current coils. The filter appliance comprises shielding coils 214, 215 and 216 shown in FIG. 2b. Each of the main current coils 207, 208 and 209 is provided with one of the shielding coils 214, 215 and 216. First ends of the shielding coils are electrically connected to a third electrical terminal 219 of the filter appliance either with short circuits, e.g. with mere copper wires, or via electrical components 220, 221 and 222 providing impedance. Each of the electrical components 220, 221 and 222 can be, for example, a capacitor, a resistor, or a combination of one or more capacitors and one or more resistors. The shielding coils 214, 215 and 216 are open ended at their second ends. Each of the shielding coils 214, 215 and 216 is formed of foil conductor that is alongside and a distance apart from the foil conductor of the corresponding main current coil so as to form a capacitive shield between successive turns of the corresponding main current coil. Details of the main current coil 207 and the shielding coil 214 are shown in a partial magnification 210. The main current coil 207 comprises a foil conductor 211 and the shielding coil 214 comprises a foil conductor 217. The shielding coil 214 is kept a distance apart from the main current coil with the aid of insulating layers 212 and 218. It is also possible that, instead of the insulating layers 212 and 218, there are discrete spacer-elements arranged to keep the main current coil and the shielding coil a distance apart from each other. The foil conductors 211 and 217 can be made of, for example, copper or aluminium. The insulating layers 213 and 218, or correspondingly the spacer-elements, may comprise for example mica insulator. It is also possible to provide each of the main current coils 207, 208 and 209 with two, or even more, shielding coils for example in such a manner that the foil conductor of each main current coil is located between the foil conductors of two shielding coils associated with that main current coil.

The filter appliance may comprise a magnetic core structure 213 made of magnetically amplifying material, i.e. material having the relative permeability greater than unity ($\mu_r > 1$). The magnetic core structure can be made of ferromagnetic or paramagnetic material. The magnetic core structure is preferably made of soft magnetic material that provides low hysteresis and eddy current losses, e.g. electrical steel sheets, soft magnetic powder, ferrites, etc. The magnetic core structure comprises legs 223, 224 and 225 each of which being surrounded by one of the main current coils and at least one of the shielding coils. The magnetic core structure may comprise one or more magnetic gaps, e.g. an air gap or a gap filled with other non-magnetic material such as plastics. Furthermore, in order to attenuate possible oscillations of electrical currents and voltages, the magnetic core structure may be made of material in which hysteresis and/or eddy current losses take place at a suitable extent. It is also possible to provide the magnetic core structure with one or more pieces of suitable lossy material.

It is also possible that the filter appliance is an air-core filter i.e. there is no magnetically amplifying material on the routes of magnetic fluxes produced by electrical currents flowing in the main current coils and by electrical currents flowing in the shielding coils. The main current coils and the shielding coils can be mechanically supported with a coil holder 246 that can be made of, for example, plastics. In order to attenuate possible oscillations of electrical currents and voltages, the routes of the magnetic fluxes can be provided with one or more pieces of suitable lossy material.

For lower frequencies applying a magnetically amplifying core material is beneficial to increase the inductances of the filter. At high frequencies, however, the eddy current losses in the core material may worsen the filtering properties of the LC filter. An air core system does not have this adverse effect but requires a large core cross-sectional area and large amount of turns of coils for a certain inductance.

In filter appliance according to an embodiment of the invention, a cross section of each leg of the magnetic core structure is dimensioned to cover less than 75% of a cross section of a space surrounded by the coils surrounding that leg. Hence, for magnetic flux flowing through the said coils, there is provided an additional route parallel to that leg. The additional path can be e.g. air or plastics. This means that the cross sectional area of the magnetic core legs 223, 224, 225 is reduced so that magnetically amplifying material and non-magnetic material, e.g. air or plastics, are arranged to provide parallel routes for magnetic flux. Such an arrangement provides high inductance at low frequencies and also a reasonably high inductance at higher frequencies providing optimal attenuation for both low and high order harmonic frequencies in the system. It is also possible to have non-magnetic legs and magnetically amplifying yokes in the filter appliance or vice versa. However, a large enough non-magnetic route must be left for the system in order to guarantee high enough inductances at higher frequencies.

Figure 3:
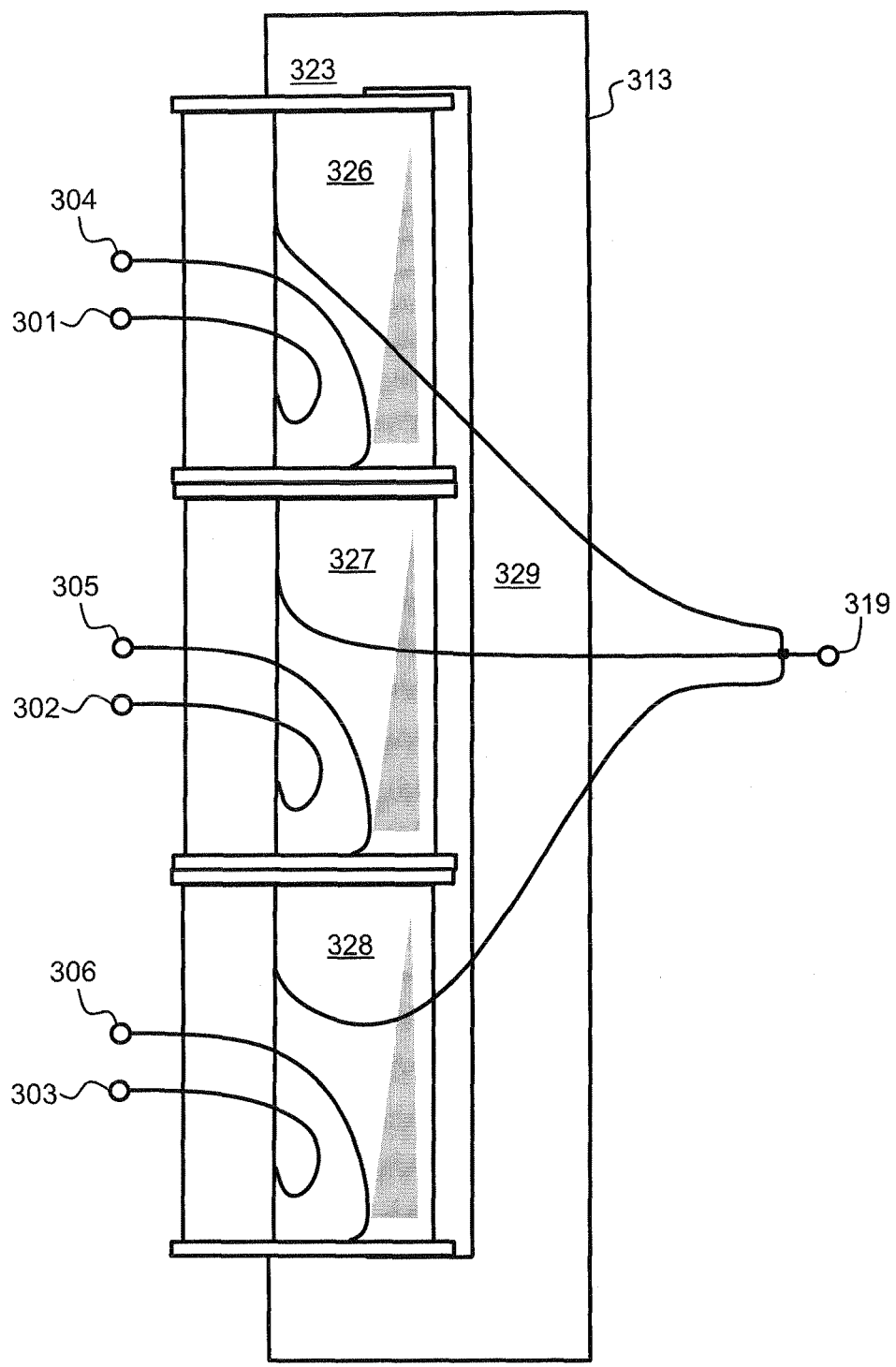

The mechanical structure of the filter appliance shown in FIGS. 2a and 2b is not the only possible choice. For example, for providing a symmetric filter appliance, the legs 223, 224 and 225 can be arranged to locate in such a manner that the cross sections of the legs shown in FIG. 2b are situated on a circle 120 degrees apart from each other or, in more general terms, 360°/N apart from each other, N being the number of phases. FIG. 3 shows a filter appliance according to an embodiment of the invention and suitable for a three-phase electrical converter device. The filter appliance comprises electrical terminals 301, 302 and 303 for receiving alternating voltages produced by a three-phase electrical converter device. The filter appliance comprises second electrical terminals 304, 305 and 306 for electrically connecting to e.g. a three-phase electrical motor or generator. The filter appliance comprises coils arrangements 326, 327 and 328 that may be similar to the corresponding coils arrangements 226, 227 and 228 illustrated in FIGS. 2a and 2b. Each of the coil arrangements 326, 327 and 328 comprises a main current coil formed of foil conductor and at least one shielding coil formed of foil conductors. First ends of the shielding coils are electrically connected to a third electrical terminal 319. The filter appliance comprises a magnetic core structure 313 made of magnetically amplifying material and comprising a leg 323 surrounded by the main current coils and the shielding coils. It is also possible that the cross sectional area of the leg 323 is so small that the leg 323 and non-magnetic material, e.g. air or plastics, flanking the leg are arranged to provide parallel routes for magnetic flux. The magnetic core structure 313 comprises a leg 329 arranged to form a magnetic path for a common mode magnetic flux produced by electrical currents flowing in the main current coils and by electrical currents flowing in the shielding coils.

Figure 4:
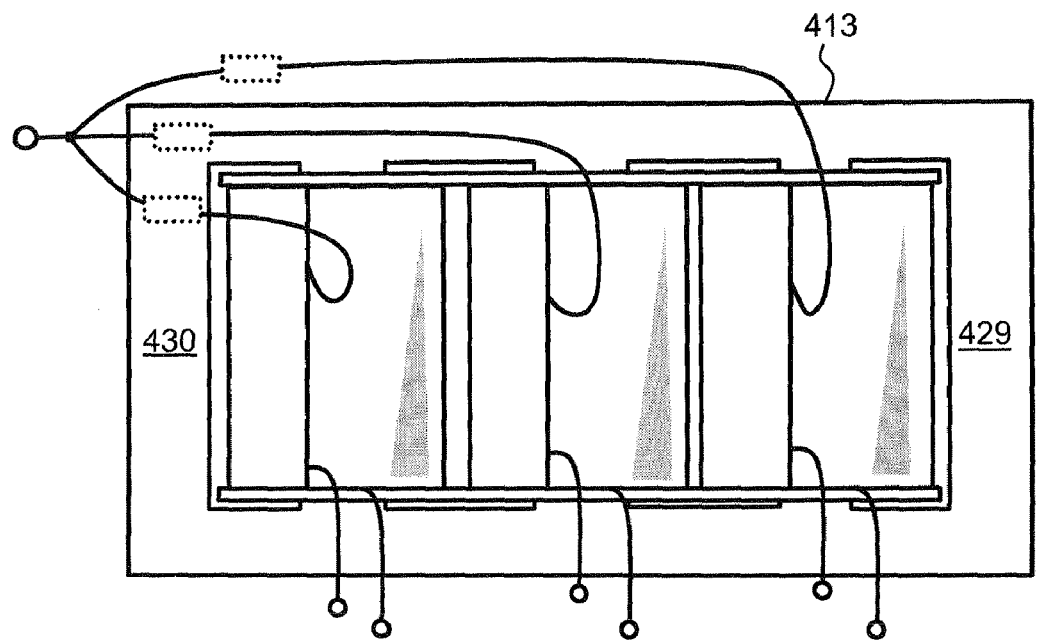
FIG. 4 shows a filter appliance according to an embodiment of the invention and suitable for a three-phase electrical converter device.

FIG. 4 shows a filter appliance according to an embodiment of the invention and suitable for a three-phase electrical converter device. The filter appliance is otherwise similar to the filter appliance shown in FIGS. 2a and 2b but the magnetic core structure 413 comprises legs 429 and 430 arranged to form a magnetic path for a common mode magnetic flux produced by electrical currents flowing in the main current coils and by electrical currents flowing in the shielding coils.

Figure 5:
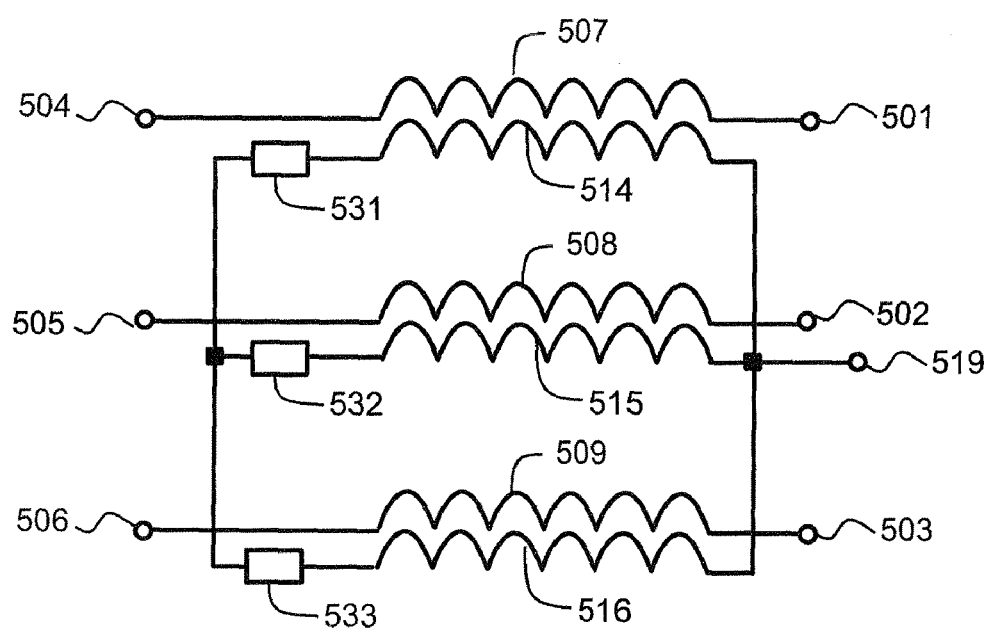
FIG. 5 shows a circuit diagram of a filter appliance according to an embodiment of the invention and suitable for a three-phase electrical converter device.

FIG. 5 shows a circuit diagram of a filter appliance according to an embodiment of the invention and suitable for a three-phase electrical converter device. The filter appliance comprises first electrical terminals 501, 502 and 503 for receiving alternating voltages produced by a three-phase electrical converter device. The filter appliance comprises second electrical terminals 504, 505 and 506 for electrically connecting to an external electrical system. The filter appliance comprises main current coils 507, 508 and 509 formed of foil conductors and shielding coils 514, 515 and 516 formed of foil conductors. First ends of the shielding coils are electrically connected to a third electrical terminal 519 of the filter appliance and the foil conductor of each of the shielding coils is alongside and a distance apart from the foil conductor of the corresponding main current coil so as to form a capacitive shield between successive turns of the corresponding main current coil. Second ends of the shielding coils 514, 515 and 516 are electrically connected to each other via electrical components 531, 532 and 533 providing impedance. The impedances of the electrical components 531, 532 and 533 have to be sufficiently high in order to avoid too high losses but, with a suitable design of the electrical components 514, 515 and 516, possible oscillations of electrical currents and voltages can be attenuated.

Figure 6:
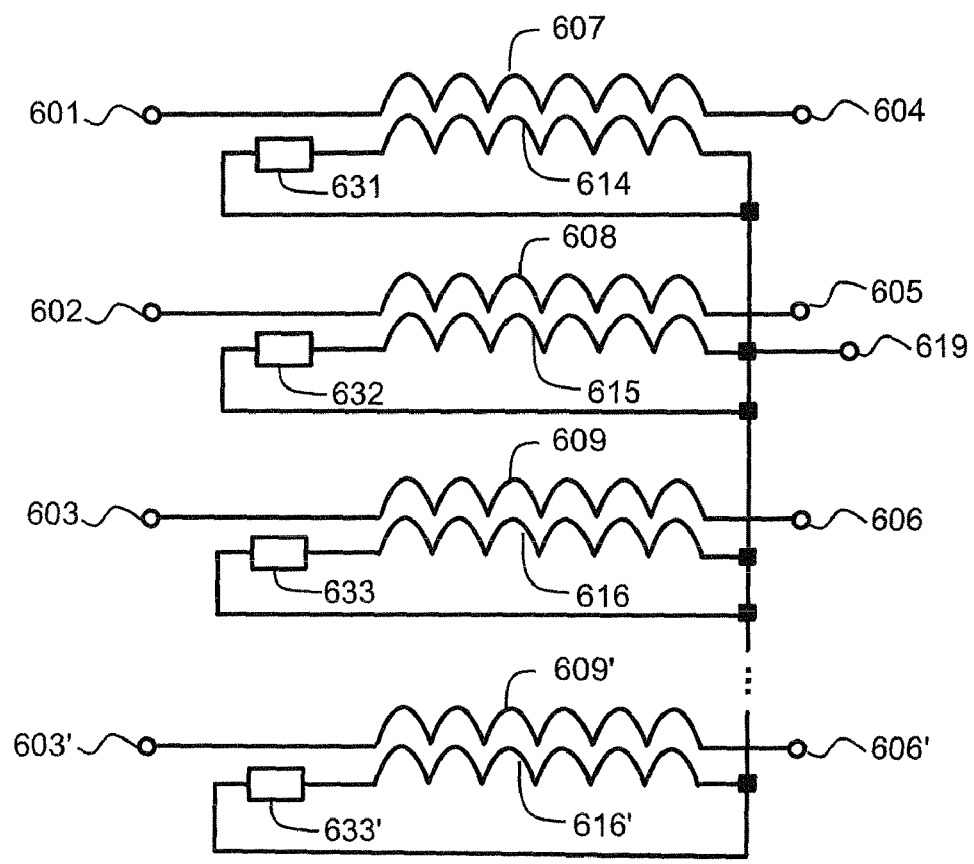
FIG. 6 shows a circuit diagram of a filter appliance according to an embodiment of the invention and suitable for an N-phase electrical converter device.

FIG. 6 shows a circuit diagram of a filter appliance according to an embodiment of the invention and suitable for an N-phase electrical converter device (N>3). The filter appliance comprises first electrical terminals 601, 602, 603, . . . , 603' for receiving alternating voltages produced by an N-phase electrical converter device. The filter appliance comprises second electrical terminals 604, 605, 606, . . . , 606' for electrically connecting to an external electrical system. The filter appliance comprises main current coils 607, 608, 609, . . . , 609' formed of foil conductors and shielding coils 614, 615, 616, . . . , 616' formed of foil conductors. First ends of the shielding coils are electrically connected to a third electrical terminal 619 of the filter appliance and the foil conductor of each of the shielding coils is alongside and a distance apart from the foil conductor of the corresponding main current coil so as to form a capacitive shield between successive turns of the corresponding main current coil. A second end of each of the shielding coils 614-616, . . . , 616' is electrically connected to the first end of that shielding coil via an electrical component 631, 632, 633, . . . or 633' providing impedance. The impedances of the electrical components 631-633, . . . , 633' have to be sufficiently high in order to avoid too high losses but, with a suitable design of the electrical components, possible oscillations of electrical currents and voltages can be attenuated.

A multiphase electrical converter device according to an embodiment of the invention comprises a converter stage arranged to produce multiphase alternating voltage and a filter appliance according to an embodiment of the invention. The main current coils of filter appliance are electrically connected, possibly via a cable, to alternating voltage terminals of the converter stage and first ends of the shielding coils of the filter appliance are electrically connected to an electrical node having a substantially constant electrical potential.

Figure 7:
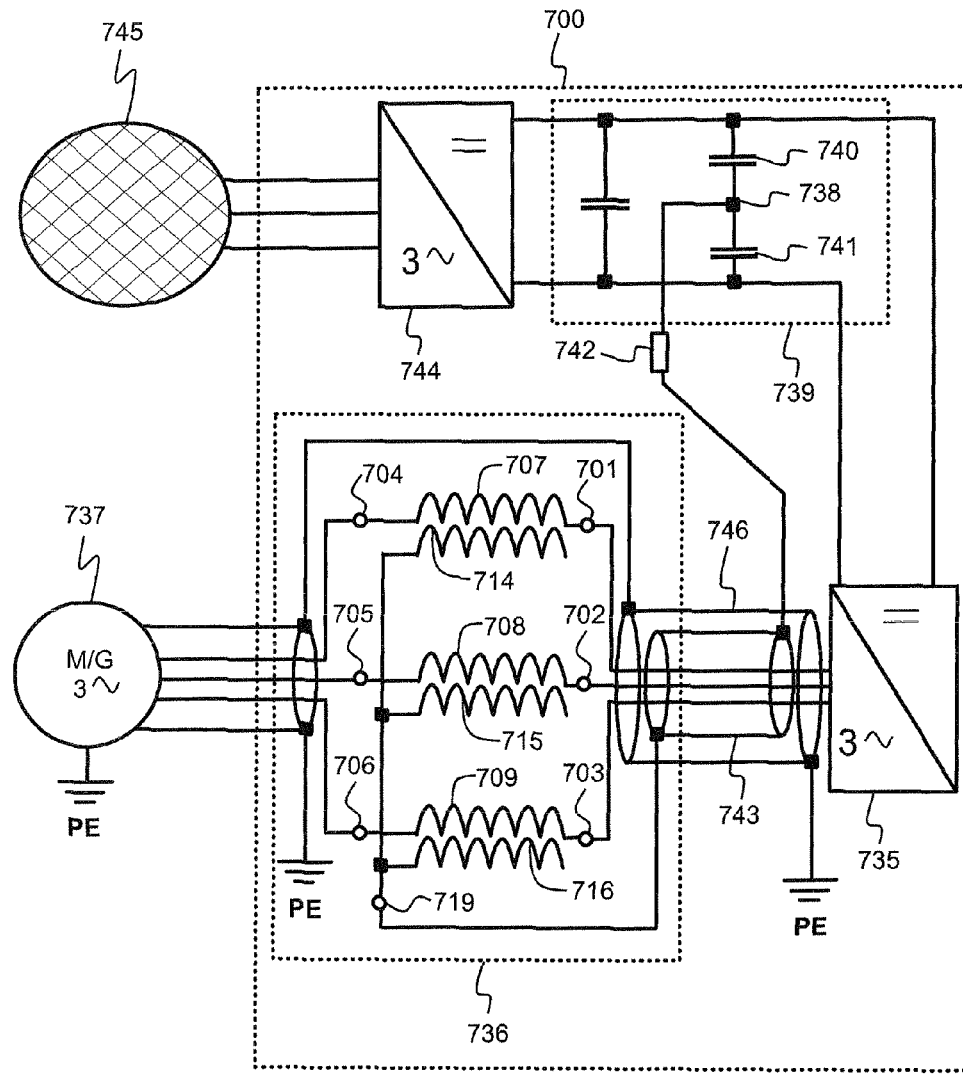
FIG. 7 shows a block diagram of a multiphase electrical converter device according to an embodiment of the invention.

FIG. 7 shows a block diagram of a multiphase electrical converter device 700 according to an embodiment of the invention. The multiphase electrical converter device comprises a converter stage 735 arranged to convert (invert) direct voltage of a direct voltage intermediate circuit 739 to three-phase alternating voltage for e.g. a motor and/or to convert (rectify) three-phase alternating voltage of e.g. a generator to direct voltage. The converter stage 735 is able to transfer energy from the intermediate circuit 739 to an external electrical system 737 and/or to transfer energy from the external electrical system 737 to the intermediate circuit. In the exemplifying case shown in FIG. 7, the external electrical system 737 is a three-phase electrical machine capable of operating as a motor and/or as a generator. The converter stage 735 can be, for example, a PWM-inverter stage (PWM=Pulse Width Modulation). The direct voltage intermediate circuit 739 is electrically connected to an alternating voltage network 745 with a converter stage 744 arranged to convert three-phase alternating voltage of alternating voltage network 745 to direct voltage and/or to convert the direct voltage of a direct voltage intermediate circuit 739 to three-phase alternating voltage. The converter stage 744 is able to transfer energy from the alternating voltage network 745 to the intermediate circuit 739 and/or to transfer energy from the intermediate circuit to the alternating voltage network. The converter stage 744 can be e.g. a diode rectifier or a PWM-inverter stage. The converter stage 735 can be as well an AC-to-AC (Alternating Current) direct converter arranged to convert three-phase alternating voltage to three-phase alternating voltage of different frequency and amplitude by synthesizing the waveforms of output voltages from segments of the waveforms of input voltages without a direct voltage intermediate circuit.

The multiphase electrical converter device 700 comprises a filter appliance 736. The filter appliance 736 comprises first electrical terminals 701, 702 and 703 electrically connected, possibly via a cable, to alternating voltage terminals of the converter stage 735 and second electrical terminals 704, 705 and 706 for electrically connecting to the external electrical system 737. The filter appliance comprises main current coils 707, 708 and 709. Each of the main current coils is formed of foil conductor and is electrically connected, as shown in FIG. 7, between one of the first electrical terminals and one of the second electrical terminals of the filter appliance. The filter appliance further comprises shielding coils 714, 715 and 716 so that each of the main current coils is provided with one of the shielding coils and first ends of the shielding coils are electrically connected to a third electrical terminal 719 of the filter appliance. Each of the shielding coils 714, 715 and 716 is formed of foil conductor that is alongside and a distance apart from the foil conductor of the corresponding main current coil so as to form a capacitive shield between successive turns of the corresponding main current coil. The third electrical terminal 719 is electrically connected to an electrical node 738 having a substantially constant electrical potential. In the exemplifying case shown in FIG. 7, the electrical node having the substantially constant electrical potential is a middle node of a series connection of capacitors 740 and 741 of the direct voltage intermediate circuit 739. The electrical node having the substantially constant electrical potential could also be, for example, a star-point of a supply transformer (not shown).

As shown in FIG. 7, the first ends of the shielding coils 714, 715 and 716 that are electrically connected to the electrical terminal 719 are those ends of the shielding coils which are closer to the ends of the main current coils joined to the second electrical terminals 704-706 than the opposite ends of the main current coils joined to the first electrical terminals 701-703. Experiments have shown that a more advantageous filtering operation is achieved when the shielding coils 714, 715 and 716 are electrically connected in the above-described manner so that capacitively coupled electrical current in a shielding coil flows in a same direction as electrical current in the respective main current coil when the electrical current in the respective main current coil flows towards the external electrical system 737.

In a multiphase electrical converter device according an embodiment of the invention, the third electrical terminal 719 is electrically connected to the electrical node 738 having the substantially constant electrical potential via an electrical component 742 providing impedance. The electrical component can be, for example, a capacitor, a resistor, or a combination of one or more capacitors and one or more resistors. The electrical component can be used for limiting the electrical current flowing between the electrical terminal 719 and the electrical node 738 having the substantially constant electrical potential. If this electrical current gets too high, the protection systems of the converter device 700 might interpret the situation as an earth fault situation and, as a consequence, erroneously break off the operation of the converter device.

In a multiphase electrical converter device according an embodiment of the invention, a cabling between the converter stage 735 and the filter appliance 736 comprises an electrically conductive sleeve 743 arranged to surround electrical wires electrically connected to the alternating voltage terminals of the converter stage. The third terminal 719 of the filter appliance is electrically connected to the electrical node 738 having the substantially constant electrical potential via the electrically conductive sleeve. The sleeve provides a low-inductance path for the electrical current flowing to/from the electrical terminal 719. In a multiphase electrical converter device according an embodiment of the invention, the cabling between the converter stage 735 and the filter appliance 736 comprises, in addition the electrically conductive sleeve 743, another electrically conductive sleeve 746 arranged to surround the electrically conductive sleeve 743 and connected to the protection earth (PE).

The above-described multiphase electrical converter device 700 is a three-phase electrical converter device. It should be noted, however, that in a multiphase electrical converter device according to an embodiment the invention the number of phases can be also greater than three.

A method according to an embodiment of the invention for filtering voltages produced by a multiphase electrical converter device comprises using a filter appliance according to an embodiment of the invention on routes of electrical currents between alternating voltage terminals of the multiphase electrical converter device and an external electrical system, e.g. an electrical motor or generator.

The specific examples provided in the description given above should not be construed as limiting. Therefore, the invention is not limited merely to the embodiments described above, many variants being possible.

What is claimed is:

1. A filter appliance for a multiphase electrical converter device, the filter appliance comprising:
   at least three first electrical terminals for receiving alternating voltages produced by the multiphase electrical converter device,
   at least three second electrical terminals for electrically connecting to an external electrical system,
   at least three main current coils, each of the main current coils being formed of foil conductor and being electrically connected between one of the first electrical terminals and one of the second electrical terminal,
   shielding coils, and
   a magnetic core structure made of magnetically amplifying material and comprising legs each of which being surrounded by one of the main current coils and at least one of the shielding coils,
   wherein each of the main current coils is provided with at least one of the shielding coils and first ends of the shielding coils are electrically connected to a third electrical terminal of the filter appliance, each of the shielding coils being formed of foil conductor that is alongside and a distance apart from the foil conductor of the corresponding main current coil so as to form a capacitive shield between successive turns of the corresponding main current coil, the main current coils are mutually adjacent so that magnetic axes of the main current coils are separate, and
   a cross section of each leg is dimensioned to cover less than 75% of a cross section of a space surrounded by one or more of the main current coils and one or more of the shielding coils surrounding that leg so as to provide, for magnetic flux, an additional path parallel to that leg.

2. A filter appliance according to claim 1, wherein the first ends of the shielding coils are electrically connected with short circuits to the third electrical terminal.

3. A filter appliance according to claim 1, wherein the first ends of the shielding coils are electrically connected to the third electrical terminal via electrical components providing impedance.

4. A filter appliance according to claim 3, wherein each of the electrical components is one of the following: a capacitor, a resistor, a combination of one or more capacitors and one or more resistors.

5. A filter appliance according to claim 1, wherein the magnetic core structure further comprises at least one leg arranged to form a magnetic path for a common mode magnetic flux produced by electrical currents flowing in the main current coils and by electrical currents flowing in the shielding coils.

6. A filter appliance according to claim 1, wherein second ends of the shielding coils are electrically connected to each other via electrical components providing impedance.

7. A filter appliance according to claim 1, wherein a second end of each of the shielding coils is electrically connected to the first end of that shielding coil via an electrical component providing impedance.

8. A filter appliance according to claim 1, wherein the foil conductors of the main current coils and the foil conductors of the shielding coils are electrically insulated from each other with mica insulator.

9. A multiphase electrical converter device, comprising:
   a converter stage arranged to produce multiphase alternating voltage,
   a filter appliance comprising first electrical terminals electrically connected to alternating voltage terminals of the converter stage, second electrical terminals for electrically connecting to an external electrical system, and main current coils, each of the main current coils being formed of foil conductor and being electrically connected between one of the first electrical terminals and one of the second electrical terminals, wherein the filter appliance further comprises shielding coils so that each of the main current coils is provided with at least one of the shielding coils and first ends of the shielding coils are electrically connected to a third electrical terminal that is electrically connected to an electrical node having a substantially constant electrical potential, each of the shielding coils being formed of foil conductor that is alongside and a distance apart from the foil conductor of the corresponding main current coil so as to form a capacitive shield between successive turns of the corresponding main current coil, and
   a cabling between the converter stage and the filter appliance comprises an electrically conductive sleeve arranged to surround electrical wires electrically connected to the alternating voltage terminals of the converter stage, and the third terminal is electrically connected to the electrical node having the substantially constant electrical potential via the electrically conductive sleeve.

10. A multiphase electrical converter device according to claim 9, wherein the first ends of the shielding coils are ends of the shielding coils which are closer to ends of the main current coils joined to the second electrical terminals than opposite ends of the main current coils joined to the first electrical terminals.

11. A multiphase electrical converter device according to claim 9, wherein the multiphase electrical converter device comprises a direct voltage intermediate circuit and the electrical node having the substantially constant electrical potential is a middle node of a series connection of capacitors of the direct voltage intermediate circuit.

12. A multiphase electrical converter device according to claim 9, wherein the third electrical terminal is electrically connected to the electrical node having the substantially constant electrical potential via an electrical component providing impedance.

13. A multiphase electrical converter device according to claim 12, wherein the electrical component is one of the following: a capacitor, a resistor, a combination of one or more capacitors and one or more resistors.

14. A multiphase electrical converter device according to claim 9, wherein the cabling between the converter stage and the filter appliance comprises another electrically conductive sleeve arranged to surround the electrically conductive sleeve and connected to the protection earth.

15. A multiphase electrical converter device according to claim 9, wherein the first ends of the shielding coils are electrically connected with short circuits to the third electrical terminal.

16. A multiphase electrical converter device according to claim 9, wherein the first ends of the shielding coils are electrically connected to the third electrical terminal via electrical components providing impedance.

17. A multiphase electrical converter device according to claim 16, wherein each of the electrical components is one of the following: a capacitor, a resistor, a combination of one or more capacitors and one or more resistors.

18. A multiphase electrical converter device according to claim 9, wherein the filter appliance comprises a magnetic core structure made of magnetically amplifying material and comprising legs each of which being surrounded by one of the main current coils and at least one of the shielding coils.

19. A multiphase electrical converter device according to claim 9, wherein the filter appliance comprises a magnetic core structure made of magnetically amplifying material and comprising a leg surrounded by the main current coils and the shielding coils.

20. A multiphase electrical converter device according to claim 18 or 19, wherein a cross section of each leg is dimensioned to cover less than 75% of a cross section of a space surrounded by one or more of the main current coils and one or more of the shielding coils surrounding that leg so as to provide, for magnetic flux, an additional path parallel to that leg.

21. A multiphase electrical converter device according to claim 18 or 19, wherein the magnetic core structure further comprises at least one leg arranged to form a magnetic path for a common mode magnetic flux produced by electrical currents flowing in the main current coils and by electrical currents flowing in the shielding coils.

22. A multiphase electrical converter device according to claim 9, wherein second ends of the shielding coils are electrically connected to each other via electrical components providing impedance.

23. A multiphase electrical converter device according to claim 9, wherein a second end of each of the shielding coils is electrically connected to the first end of that shielding coil via an electrical component providing impedance.

24. A multiphase electrical converter device according to claim 9, wherein the foil conductors of the main current coils and the foil conductors of the shielding coils are electrically insulated from each other with mica insulator.

\* \* \* \* \*